United States Patent [19]

Grandstaff

[11] Patent Number: 4,741,031
[45] Date of Patent: Apr. 26, 1988

[54] INTRINSICALLY SAFE TELEPHONE

[75] Inventor: Larry P. Grandstaff, West Lawn, Pa.

[73] Assignee: Gai-Tronics, Reading, Pa.

[21] Appl. No.: 879,329

[22] Filed: Jun. 27, 1986

[51] Int. Cl.⁴ .............................................. H01M 1/18
[52] U.S. Cl. .................................. 379/375; 379/391; 379/167; 379/176
[58] Field of Search ............... 379/167, 176, 350, 375, 379/387, 397, 412, 391, 392, 170

[56] References Cited

U.S. PATENT DOCUMENTS

| | | | |
|---|---|---|---|
| 3,558,830 | 1/1971 | Bender | 379/412 |
| 3,997,733 | 12/1976 | Sanders | 379/167 |
| 4,064,366 | 12/1977 | Wheatley et al. | 379/387 |
| 4,113,985 | 9/1978 | Day | 379/387 |
| 4,214,127 | 6/1980 | Oules | 379/387 |
| 4,400,589 | 8/1983 | Synek et al. | 379/391 |
| 4,401,847 | 8/1983 | Schneider et al. | 379/170 |
| 4,465,903 | 8/1984 | Barber | 379/412 |

OTHER PUBLICATIONS

Texas Instruments Learning Center, Sidetone, 1983, pp. 2-24.

Primary Examiner—Robert Lev
Attorney, Agent, or Firm—Woodcock Washburn Kurtz Mackiewicz & Norris

[57] ABSTRACT

An intrinsically safe telephone as provided for use in hazardous areas. The telephone includes a single line instrument located in the hazardous area which, in turn, is coupled by a two-wire transmission path to a shunt diode barrier and a telephone line interface located in a safe environment. The telephone line interface reduces power of incoming ringing and audio signals. The telephone line interface further includes an off hook indicating circuit which senses when the single line instrument is off hook. The telephone line interface further includes a bootstrap power supply for powering the single line instrument whenever the single line instrument is off hook. The intrinsically safe telephone is line powered and requires no auxiliary power in the hazardous environment. The intrinsically safe telephone is useful in all hazardous environments as classified by the National Electrical Code and requires no explosion-proof housing.

8 Claims, 4 Drawing Sheets

INTRINSICALLY SAFE TELEPHONE

The present invention is directed to an intrinsically safe telephone for use in hazardous areas or in areas in which safety is a major consideration and, in particular, is directed to an intrinsically safe telephone which is useful in such areas and which does not require the use of an expensive explosion-proof housing of the type required by the prior art.

BACKGROUND OF THE INVENTION

A wide range of industries such as, for example, electric utilities, power plants, oil refineries, off shore oil rigs, gas ethylene companies, chemical plants, coal mining operations, coal prep plants and transfer stations, gas pipelines, plastic manufacturers, granaries, etc. present very hazardous environments in which electrical equipment must be used. Because of these dangerous environments and because of the hazards imposed by the use of electrical equipment in them, various standards have been imposed by the National Electrical Code and by Underwriters Laboratories for the design of electrical equipment for hazardous areas.

The National Electrical Code (NEC) classifies hazardous areas in industrial environments depending upon the properties of the materials found in those environments. (See ANSI/NFPA-70, Article 500.) Class 1 hazardous environments are those containing inflammable gases and vapors. Class 2 hazardous areas are those containing inflammable dusts. Class 3 hazardous areas are those containing fibers and flyings. Within each of the aforementioned classes, environments are further grouped in accordance with the particular materials found there. Class 1, Group A, environments are those which include acetylene gas. For example, Class 1, Group A, environments are the most hazardous environments classified by the NEC and these require the most stringent specifications for electrical equipment. Because of the nature of acetylene gas, very little electrical equipment has ever been approved for use in Class 1, Group A, environments. In fact, no telephone equipment has ever been approved for use in such locations.

Class 1, Group B, environments are those including hydrogen gas or manufactured gases containing more than 30% hydrogen by volume. Class 1, Group C, environments are those containing carbon monoxide, hydrogen sulfide, crude oil, etc. Class 1, Group D, environments are those containing acetone, benzone, butyl, ethyl, methyl, propyl and isopropyl alcohols, gasoline, methane, styrene, toluene, vinyl chloride, etc. Telephone equipment has been approved for use in Class 1, Group B, C and D, environments but such equipment is very expensive.

Electrical equipment, including telephones, which is approved for use in Class 1 hazardous areas as classified by the NEC, without the use of approved enclosures, i.e., explosion-proof, purged and pressurized, is referred to as "intrinsically safe". Typical prior art explosion-proof telephones approved for use in Class 1, Groups B, C and D type hazardous environments have enclosures which are not air tight. The enclosures for such explosion-proof telephones, therefore, allow the entry of the surrounding hazardous atmosphere. Any arcing of the device within its enclosure can, therefore, cause ignition inside the enclosure. The enclosure must therefore be constructed to withstand and contain the resulting high pressures caused by the internal explosion. Such enclosures usually include heavy aluminum castings with wide, closely machined cover plates secured in place by many hold down bolts. Any pass through devices through the enclosure, such as push buttons or rotary motion switches, must also maintain certain clearances with a minimum length bushing or sleeve. Such enclosures are heavy and expensive to construct.

It would be desirable to provide a hazardous area telephone for use in Class 1, Group B, C and D, type hazardous environments as classified by the National Electrical Code which did not require the use of an explosion-proof housing of the type described above. It would be further desirable to provide an intrinsically safe telephone for use in Class 1, Group A, environments and it would be even more desirable to produce such a telephone which did not require an explosion-proof housing.

The design of an intrinsically safe telephone which meets Underwriter Laboratories (UL) requirements for installation in hazardous environments of the type classified by the National Electrical Code is not a simple matter.

In addition to meeting the constraints imposed by Underwriters Laboratories, it is also required that an intrinsically safe telephone meet the requirements of the Federal Communications Commission for interface with standard telephone networks. Thus, while an intrinsically safe telephone meeting the object of the present invention must meet the requirements of the NEC and of the Underwriters Laboratories for hazardous environments, it must also have standard line impedances and characteristics in order to interface with pre-existing telephone networks.

Accordingly, it is an object of the present invention to provide an intrinsically safe telephone which is capable of operating in all hazardous environments as defined by the National Electrical Code, which does so without the use of an expensive explosion-proof housing, which meets all of the requirements of Underwriters Laboratories for operation within hazardous environments and which is fully compatible with pre-existing telephone networks.

The difficulty with prior art telephones intended to be intrinsically safe has been the fact that such telephones require auxiliary power. Special cabling runs must be made in large plants to provide electrical power for operation of telephones in hazardous areas. These cable runs are costly. In addition, loss of electrical power to the plant results in a loss of telephone communications. Since telephones may be located in hazardous areas for use in emergency situations, it is particularly disadvantageous to lose telephone communication during a power outage. It would be particularly desirable to provide an intrinsically safe telephone for use in hazardous environments which did not require auxiliary power cabling.

SUMMARY OF THE INVENTION

These and other objects of the present invention are achieved by an intrinsically safe telephone which includes a linepowered, as opposed to an auxiliary-powered, single line instrument. The single line instrument is located in a hazardous environment and is coupled via a two-wire transmission path to a safe environment. Located in the safe environment is an electrical isolation means which includes a telephone line interface and a shunt diode barrier for reducing and controlling maximum power to the single line instrument. The telephone line interface reduces line power from the network to the single line instrument and also reduces the power of incoming ringing signals from the network so as to comply with the requirements of Underwriters Laboratories. The line-powered single line instrument provides dialing and audio output signals from an operator to the network and receives ringing and audio input signals from the network. The single line instrument is fully compatible with the network and yet is isolated from it.

In accordance with an important aspect of the present invention, the telephone line interface further includes an off hook means for indicating to the telephone network that the single line instrument is off hook such that line power may be coupled to the single line instrument via the two-wire transmission path only during the off hook mode. To accomplish this result, the present invention employs a novel bootstrap power supply means coupled between the single line instrument and the network for driving the aforementioned off hook means.

BRIEF DESCRIPTION OF THE DRAWINGS

The present invention will be more fully understood by reference to the accompanying drawings in which.

DETAILED DESCRIPTION OF THE PREFERRED EMBODIMENT

Figure 1:
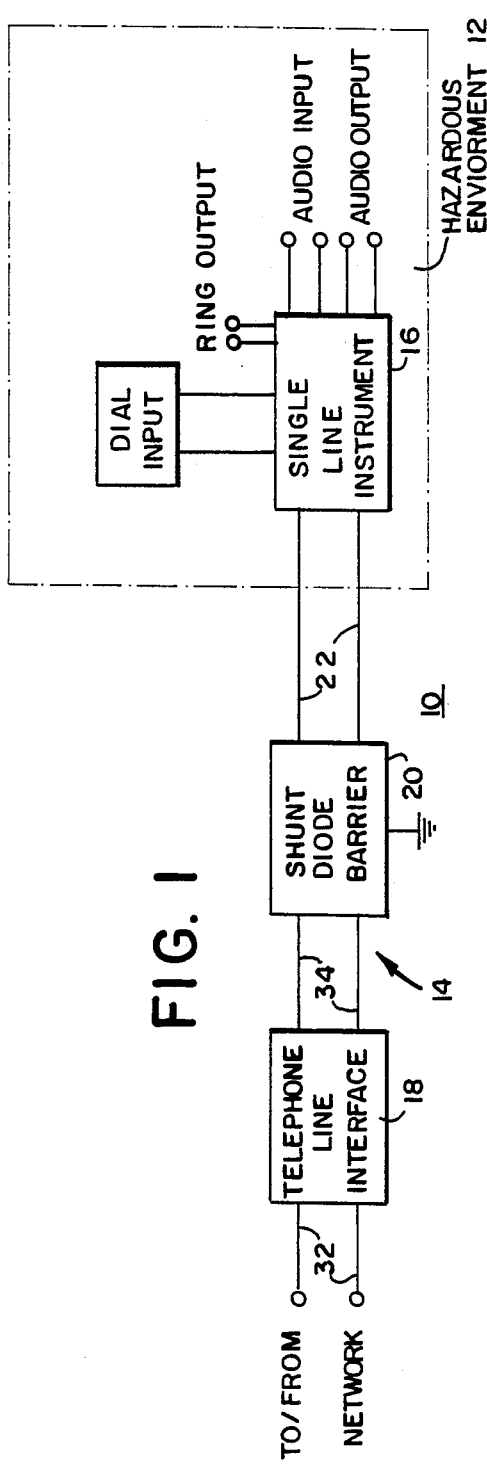
FIG. 1 is a schematic block diagram of the intrinsically safe telephone system of the present invention including a telephone line interface, a shunt diode barrier and a single line instrument.

Referring first to FIG. 1, the intrinsically safe telephone system of the present invention is shown generally at 10. The intrinsically safe telephone system 10 of the present invention includes one portion located in a hazardous environment 12 and another portion located in a safe environment shown generally at 14. The intrinsically safe telephone system of the present invention includes a single line instrument 16 which is located in the hazardous environment 12. The single line instrument 16 is capable of receiving audio input signals and ringing input signals from a telephone network and is also capable of providing an audio output signal and a dialing output signal to that network. The single line instrument 16 is connected to a standard telephone network as shown through an electrical isolation barrier. The electrical isolation barrier is located in the safe environment 14 which is remote from the single line instrument 16. The electrical isolation barrier, in accordance with the present invention, includes a telephone line interface unit 18 and a shunt diode barrier 20.

The shunt diode barrier is connected to earth ground and is connected between the telephone line interface 18 and the single line instrument 16. The shunt diode barrier 20 is connected to the single line instrument 16 by means of a two wire transmission path 22 which provides both power to, and communication with, the single line instrument 16. The shunt diode barrier unit 20 of the present invention provides current and voltage protection to the single line instrument 16 located within the hazardous environment 12.

Insofar as the telephone network is concerned, the telephone line interface 18 of the present invention provides the requisite impedance and line characteristics to satisfy the requirements of the Federal Communications Commission. Insofar as the single line instrument is concerned, the telephone line interface 18 further provides, however, voltage and current characteristics sufficient to meet the most stringent requirements of operation in hazardous environments as required by the National Electrical Code.

Figure 2:
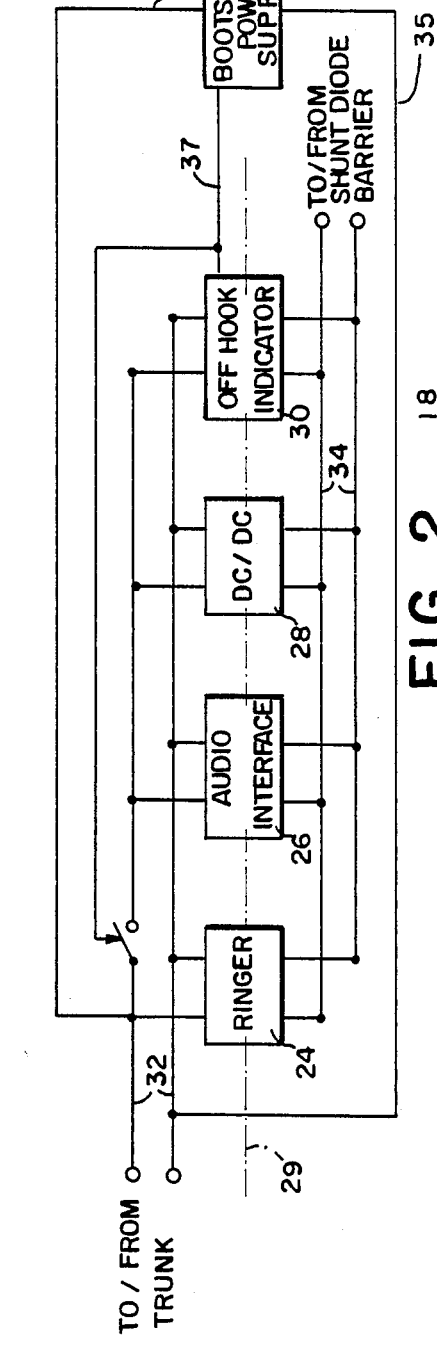
FIG. 2 is a detailed block diagram of the telephone line interface shown in FIG. 1.

Referring now to FIG. 2, the telephone line interface 18 will be described in further detail. As shown in FIG. 2, the telephone line interface 18 receives audio and ringing input signals from the telephone network via input lines 32 and is coupled to the shunt diode barrier 20 via output lines 34. As will be more fully explained below, the telephone line interface 18 provides electrical isolation separating the input lines 32 from the output lines 34 as shown by the dotted isolation line 29 in FIG. 2. The only breach of the isolation line shown in FIG. 2 is through a bootstrap power supply 31 which will be described in further detail below. As shown in FIG. 2, the telephone line interface 18 includes a number of circuits coupled between the input lines 32 and the output lines 34 across the isolation barrier. These circuits comprise a ringer circuit 24, an audio interface circuit 26, a DC/DC converter circuit 28, and an off hook indicator circuit 30. Each of the ringer circuit 24, audio interface circuit 26, DC/DC converter circuit 28, and off hook indicator circuit 30 will be described in further detail below. In addition, coupled across the input lines 32, via lines 33 and 35, is a bootstrap power supply 31. The off hook indicator circuit 30 is coupled to the bootstrap power supply 31 via line 37 for reasons which will become clear below.

In operation, the ringer circuit 24 reduces power of incoming ringing signals from the telephone network to a level suitable for the hazardous environment 12. Typically, incoming ringing signals from the telephone network are at 90 V AC at 20 Hz. These signals are attenuated by the ringer circuit 24 to approximately 5.5–6.5 V maximum at 2000 Hz.

The audio interface circuit 26 provides current and voltage isolation between the telephone network and the hazardous environment 12 and thus provides both current and voltage isolation between incoming and outgoing audio signals on opposite sides of the isolation barrier 29.

The DC/DC converter circuit 28 provides attenuated line power for the operation of the single line instrument 16 within the hazardous environment 12. The DC/DC converter circuit 16 is responsive to the approximately 48 V DC line power from a standard telephone network. As will be more fully described below, this DC signal is converted by means of a pulse width modulator circuit to an AC signal for transmission across the aforementioned isolation barrier 29. Once across the isolation barrier 29, the AC signal is then again converted to a DC signal with approximately a 8.2 volts maximum at 23 milliamps to provide line power within the hazardous environment 12.

The off hook indicator circuit 30 is responsive to the single line instrument 16 and to the bootstrap power supply 31 for providing an indication to the telephone network whenever the single line instrument 16 is off hook.

The bootstrap power supply 31 is coupled across the input lines 32, via lines 33 and 35, and is responsive to line power supplied from these input lines. The bootstrap power supply 31 stores sufficient energy to power the off hook indicator circuit 30 when the single line instrument 16 is off hook, which, in turn, activates the DC/DC converter circuit 28 to begin supplying line power to the single line instrument.

Figure 3:
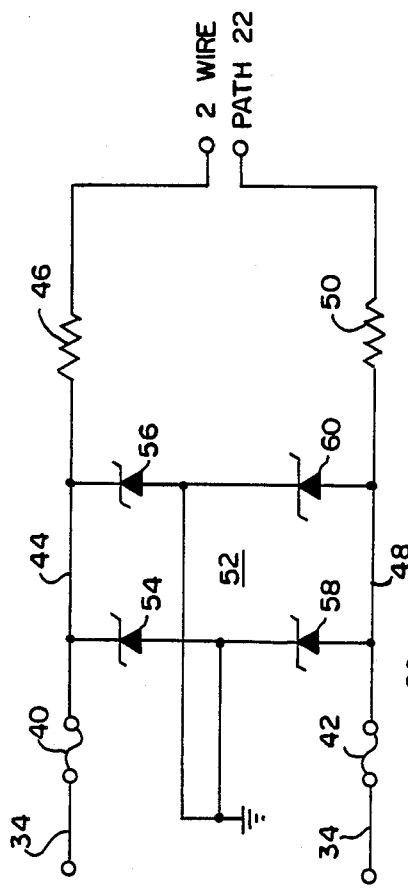
FIG. 3 is a detailed circuit diagram of the shunt diode barrier shown in FIG. 1.

Referring now to FIG. 3, the shunt diode barrier 20 will be described. As shown in FIG. 3, output lines 34 from the telephone line interface unit 18 of FIG. 2 are directed to a first fuse 40 and to a second fuse 42. The first fuse 40 is coupled via line 44 to a first resistor 46, whereas the second fuse is coupled via line 48 to a second resistor 50. Coupled across resistors 46 and 50 and fuses 40 and 42 is a zener diode network shown generally at 52 comprising first and second zener diodes 54 and 56 coupled between the first fuse 40 and earth ground and third and fourth zener diodes 58 and 60 coupled between second fuse 42 and ground.

The shunt diode barrier 20 of the present invention provides protection to the single line instrument 16 by means of the first and second fuses 40 and 42. Voltage protection to the single line instrument is provided by the zener network 52. The zener network limits voltage to the single line instrument to a maximum of 8.2 volts either side of earth ground. Current protection is provided by resistors 46 and 50. The output of the shunt diode barrier 20 is coupled to the two-wire transmission path 22 as shown.

Figure 4:
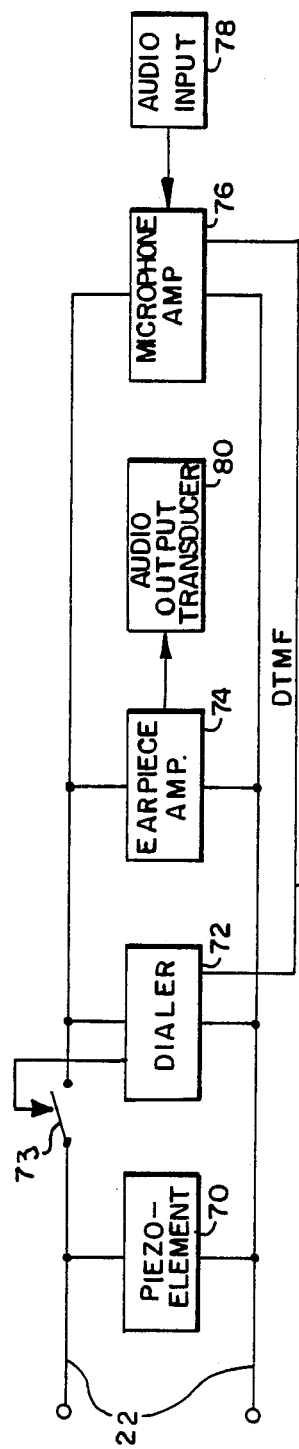
FIG. 4 is a detailed block diagram of the single line instrument shown in FIG. 1.

Turning now to FIG. 4, the single line instrument 16 of the present invention will be described in further detail. As shown in FIG. 4, the single line instrument 16 receives current and voltage protected inputs from the two-wire transmission path 22. Coupled across that two-wire transmission path are a group of circuits for receiving audio and ringing inputs from the network and for generating audio outputs, and dialing outputs to the network. Specifically, the single line instrument 16 includes a piezoelement 70 coupled across the two-wire transmission path 22. The piezoelement 70 generates a ringing output advising the operator to respond to an incoming call. Also coupled across the two-wire transmission path 22 is a dialer circuit 72 which may provide either pulse (rotary) or touchtone dialing signals for outbound transmission across the two-wire transmission path 22 to the telephone network. When pulse (rotary) dialing is employed, the dialer 72 opens and closes a switch 73 on input line 22 to provide dialing signals. Further coupled across the two-wire transmission path 22 is an earpiece amplifier 74 for amplifying incoming audio signals from the telephone network for presentation to the operator. Coupled to the earpiece amplifier 74 is an audio output transducer 80 for generating acoustic energy in response to signals from the earpiece amplifier 74. Still further coupled across the two-wire transmission path 22 is microphone amplifier 76 which is responsive to inputs from the audio input transducer 78. The audio input transducer 78 receives acoustic energy from the operator and generates an outgoing audio signal which is amplified by the microphone amplifier 76 for transmission across the two-wire transmission path 22 to the telephone network.

As shown in FIG. 4, the dialer circuit 72 is coupled to the microphone amplifier circuit via line 71. Dialing output, (DTMF), signals are amplified by microphone amplifier circuit 76 for transmission to the telephone network across two-wire transmission path 22.

Figure 5:
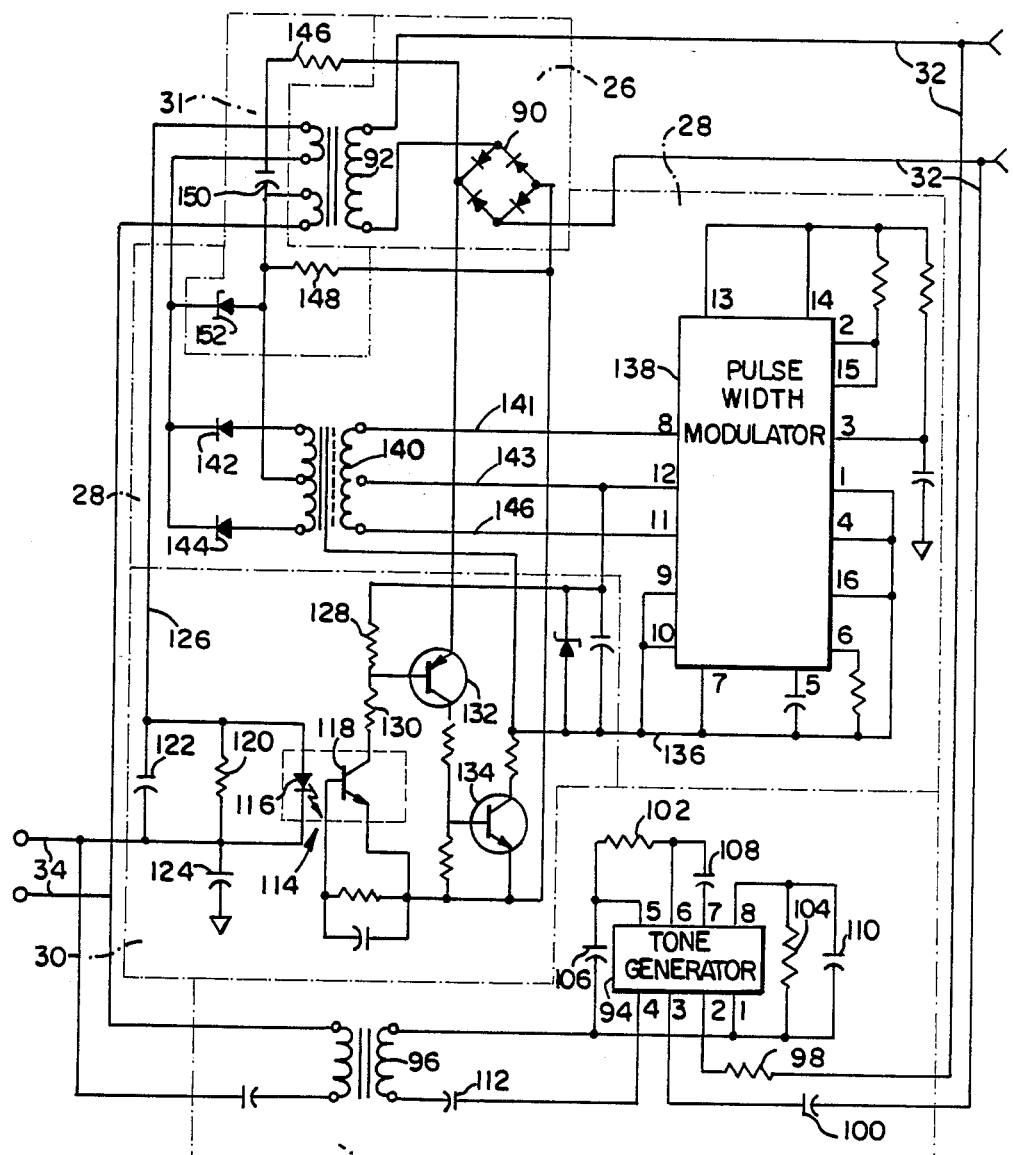
FIG. 5 is a detailed circuit diagram of the telephone line interface shown in FIG. 1.

Referring now to FIG. 5, the telephone line interface circuit 18 will be particularly described. The telephone line interface 18 as mentioned above is coupled between input lines 32 and output lines 34, the input lines 32 being coupled to the telephone network and the output lines 34 being coupled to the shunt diode barrier 20. The input lines 32 are directed to the ringer circuit 24 and to the audio interface circuit 26. As mentioned above, the ringer circuit 24 is responsive to ringing input signals from the telephone network, whereas the audio interface circuit 26 is responsive to audio input signals from the network and audio output signals from the single line instrument 16.

The audio interface circuit 26 preferably comprises rectifying bridge circuit 90 coupled to a transformer 92. The transformer 92 provides isolation between the single line instrument 16 and the telephone network 18. The rectifying bridge 90 provides DC power for operation of the DC/DC converter circuit 28 and for the off hook indicator circuit 30 in a manner which will be described below. The output of the transformer 92 is directly coupled to the output lines 34 which, in turn, are directed to the shunt diode barrier 20 and is further coupled to the bootstrap power supply 31.

The ringer circuit 24 includes a tone generator circuit 94 such as Motorola Tone Generator MC34012-2T and further includes a transformer 96 which couples the output of the tone generator 94 to the output lines 34 and which isolates the single line instrument 16 from the network. Input to the tone generator circuit 94 from input lines 32 is provided via resistor 98 and capacitor 100. Output from the tone generator 94 to the transformer 96 is provided through an RC network comprising resistors 102 and 104 and capacitors 106, 108, 110 and 112. Incoming ringing signals from the telephone network are typically 90 V at 20 Hz. These signals, when coupled to the tone generator 94, are reduced to approximately 5.5–6.5 V at 2000 Hz for transmission along output lines 34 to the piezoelement 70 of the single line instrument 16.

Line power to the single line instrument 16 is provided by the DC/DC converter circuit 28 whenever the single line instrument is off hook as determined by the off hook circuit 30. The off hook circuit 30 preferably comprises an optoelectric circuit 114 which includes a light emitting diode 116 and a photosensitive transistor 118. Use of the photoelectric circuit 114 provides isolation between the DC/DC converter 28 and the single line instrument 16 located in the hazardous environment 12. The light emitting diode 116 is normally non-conducting except when the single line instrument 16 is off hook. As shown in FIG. 5, the light emitting diode 116 is in parallel combination with a resistor 120 and a capacitor 122, the parallel combination of the capacitor 122, the resistor 120 and the light emitting diode 116 being coupled to ground via capacitor 124 as well as to the shunt diode barrier 20 via output lines 34. The light emitting diode 116 is further coupled to the bootstrap power supply 31 via line 126. As will be further described below, the bootstrap power supply 31 provides a source of power for energizing the light emitting diode 116 whenever the single line instrument 16 is off hook.

As shown in FIG. 5, the photosensitive transistor 118 is coupled to the rectifying bridge 90 by means of series resistor combination, 128 and 130. Coupled across the photosensitive transistor 118 is a two-stage DC amplifier circuit comprising transistors 132 and 134. The output of the two-stage amplifier circuit comprising transistors 132 and 134 is directed via line 136 to the DC/DC converter circuit 28.

As shown in FIG. 5, the DC/DC converter circuit 28 includes a pulse width modulator circuit 138. The pulse width modulator circuit 138 receives an input from the off hook circuit 30 along line 136 whenever the single line instrument 16 is off hook. Upon receipt of such an input along line 136, the pulse width modulator circuit generates a 12 V 17 KHz AC signal which is coupled to a center tap transformer 140 along lines 141, 143 and 146. The transformer 140 isolates the single line instrument 16 from the DC/DC converter circuit 28 of the telephone line interface 18. The AC signal output of the transformer 140 is directed to and rectified by means of diodes 142 and 144. Diodes 142 and 144 are coupled to output lines 34. The output of the DC/DC converter circuit 28 is, thus, a DC signal used to provide line power to the single line instrument 16.

In accordance with an important aspect of the present invention, bootstrap power supply 31 is provided. The bootstrap power supply 31 as shown in FIG. 5 includes two resistors, 146 and 148, a capacitor 150 and a zener diode 152. The capacitor 150 is coupled between the output coils of the transformer 92 of the audio interface circuit 26 and is further connected to each of the resistors 146 and 148. Resistors 146 and 148 are, in turn, coupled to the rectifying bridge 90. Resistors 146 and 148 are the only breach of an isolation line 29 mentioned above. This isolation is provided by the transformer 92, transformer 140, optoelectric circuit 114 and transformer 96. Resistors, 146 and 148, however, are, for example, 470 K ohm resistors permitting very small amounts of current to traverse the isolation barrier 29. A small current through resistors 146 and 148 from the rectifying bridge 90 has the effect of charging capacitor 150 of the boot-strap power supply 31 whenever the single line instrument 16 is on hook. When the single line instrument 16 is off hook, however, the capacitor 150 discharges through line 126 causing the light emitting diode 116 to conduct thereby energizing the DC/DC converter circuit 28 in order to provide necessary line power to the single line instrument 16.

Figure 6:
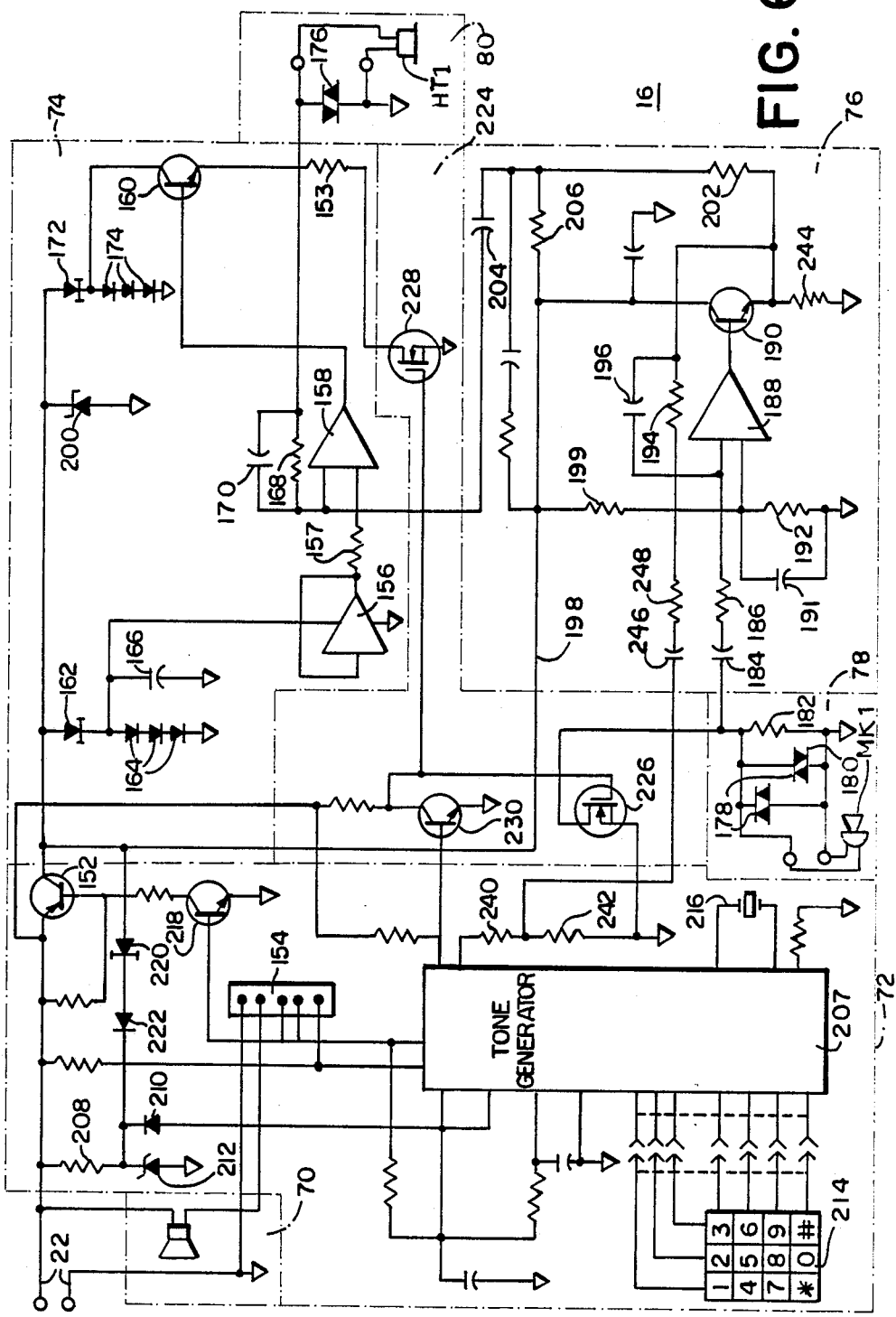
FIG. 6 is a detailed circuit diagram of the single line instrument shown in FIG. 1.

Referring now to FIG. 6, the single line instrument 16 will be particularly described. As shown in FIG. 6, output from the telephone line interface 18 is directed to the piezoelement 70 via two-wire transmission path 22. Upon receipt of ringer input signals from the ringer circuit 24, the piezoelement 70 generates an audibly detectable signal indicating to the operator that an incoming call has arrived.

The two-wire transmission lines 22 from the telephone line interface 18 are further directed to the earpiece amplifier 74 through a series path on/off switching transistor 152. The series path on/off switching transistor 152 is coupled to the hook switch 154 which will be described below. When the single line instrument 16 is off hook, the series path on/off switching transistor 152 couples incoming audio signals to the audio amplifier circuit 74. The audio amplifier circuit 74 preferably comprises an extremely low power operational amplifier circuit including two operational amplifiers 156 and 158 as well as current driver transistor 160. The earpiece amplifier circuit 74 operates in a very low voltage range such as approximately 1.8 to 1.9 volts supply voltage. One circuit useful in the environment of the present application is the amplifier circuit LM10CLN provided by National Semiconductor Corp. The operating power to the operational amplifier 156 of the earpiece amplifier circuit 74 is approximately 1.8 volt DC derived from the junction between a current diode 162 and three series connected diodes 164. A capacitor 166 is also coupled to common at the same junction. The operational amplifier 156 provides a 0.2 volt voltage reference signal at the non-inverting input of the operational amplifier 158. The feedback loop of the operational amplifier 158 includes the parallel combination of resistor 168 and capacitor 170. The output of the operational amplifier 158 is coupled to the base of the current driver transistor 160. The collector of the current driver transistor 160 is also supplied with 1.8 volt DC from the junction between a current diode 172 and the three series connected diodes 174 coupled to ground. A zener diode 200 across diodes 162, 164 and also across diodes 172 and 174. The zener diode 200 maintains the output of current drawn below a predetermined maximum. The emitter of the current driver transistor 160 is coupled to the audio output unit 80 as shown. The audio output unit 80 generates acoustic energy in accordance with the voltage across the earpiece HT1 coupling the output of the current driver transistor 160 to common. The varactor 176 limits the earpiece voltage to 0.6 volts.

Audio input to the single-line instrument 16 as shown in FIG. 6 is provided from a microphone MK1. The audio input unit 78 includes a parallel network comprising varactor 178 and a resistor 182. The voltage across this network is coupled to the microphone amplifier circuit 76 through a capacitor 184 and a resistor 186. The microphone amplifier circuit 76 includes an operational amplifier 188, the output of which is directed to a current driver transistor 190. The non-inverting input of the operational amplifier 188 is connected to common by the parallel combination of capacitor 191 and resistor 192 and to line 198 by resistor 199 whereas input from the audio input unit 78 is coupled to the non-inverting input. The feedback loop of the operational amplifier 188 includes the parallel combination of resistor 194 and capacitor 196 as well as the aforementioned current driver transistor 190. The collector of the current driver transistor 190 is coupled to the output lines 34 along line 198 for transmission of amplified audio signals to the telephone network via the two-wire transmission path 22.

In accordance with an important aspect of the present invention, the audio amplifier circuit 76 is able to self-adjust its bias level in response to changes in loop resistance along the two-wire transmission path 22. Preferably, the bias level of the audio amplifier circuit 76 is approximately 5.0 volts. The audio output signal riding upon this bias level is capped at 8.2 volts by means of a zener diode 200 and remains above the 1.8 volt DC operating level of the operational amplifier 188. In the event of a long run of the two-wire transmission line 22 between the hazardous area and the safe area which imposes increased series resistance therein, would decrease the bias level. The audio amplifier circuit 76, however, effectively increases a bias level by reducing the DC current through resistor 244 until the sensed voltage level at the non-inverting input of operational amplifier 188 is again in balance. If, on the other hand, the length of run of the two-wire transmission path 22 is short, the bias level is automatically adjusted downwardly to compensate for the same.

The emitter of the current driver transistor 190 is coupled to the collector via a path including resistors 202 and 206. The junction between resistors 202 and 206 is coupled to the earpiece amplifier 74 by a capacitor 204 in order to provide side tone rejection, i.e. the attenuation of the speaker's own voice through the earphone.

Dialing outputs from the single line instrument 16 are provided by means of dialer circuit 72. The dialer circuit 72 preferably comprises a tone and pulse generator circuit 207 such as MK5375CN provided by Mostek. Stay alive power to the tone and pulse generator circuit 207 is provided by means of current flow through a large resistor 208 such as a 680 K ohm resistor coupled to the two-wire transmission path 22. This current maintains the memory of the tone and pulse generator circuit 207 when the single line instrument is on-hook. The stay alive circuit further includes a diode 210. The stay alive input to the tone generator 207 is protected by means of a zener diode 212 coupled to common. Dialing inputs to the tone and pulse generator circuit 207 are provided by a touchtone keyboard 214. A standard frequency for use by the tone generator is provided by crystal 216. Operating power to the tone generator 207 is provided whenever the single line instrument 16 is taken off hook as determined as hook switch 154. The hook switch 154 provides operational power to the tone generator circuit 207 from the two wire transmission line 22 by means of series path on/off transistor 152. When the single line instrument 16 is off hook, series path on/off transistor 152 permits current to flow through diodes 220, 222 and aforementioned diode 210 in order to provide adequate operational power for the tone and pulse generator circuit 207.

Dialing output, (DTMF), signals from the tone and pulse generator 207 appear across the divider network comprising resistors 240 and 242. The voltage across this network is coupled to the microphone amplifier circuit 76 through a capacitor 246 and a resistor 248. The microphone amplifier circuit 76, as previously explained, delivers the amplified audio signals along line 198 for transmission to the telephone network via the two-wire transmission path 22.

Dialing output (rotary) signals are coupled to transistor 218 via hook switch 154. Transistor 218 and series path on/off transistor 152 alternately open and close the DC current loop of the single line instrument 16 in response to the rotary signals. In turn, the off hook circuit 30, previously described, responds analogous of a rotary dial to the standard telephone network in response to the opening and closing of the DC current loop.

As shown in FIG. 6, the single line instrument 16 may further comprise a muting circuit 224 coupled to the output of the dialer circuit 72. The muting circuit 224 includes a first MOSFET 226 and a second MOSFET 228 as well as transistor 230. Transistor 230 is coupled between the output of the tone generator circuit 207 and the gate contacts of MOSFET 226 and MOSFET 228. MOSFET 226 is coupled to resistor 182, whereas MOSFET 228, is coupled to resistor 153. Whenever dialing outputs are generated by the tone generator circuit 207 for amplification by the audio amplifier circuit 76, MOSFETS 226 and 228 are energized thereby shorting audio inputs at resistor 182 and audio outputs at resistor 183 which are coupled to the drain of each of the aforementioned MOSFETS. In this manner, dialing outputs are not amplified into the earpiece of the operator and are masked from ambient noise at the microphone.

It has been found that the aforementioned, intrinsically safe, telephone system 10 operates at sufficiently low electrical and thermal energy levels within the hazardous environment 12 so as to meet all of the requirements of the National Electrical Code for use in any class of environment. Moreover, this intrinsically safe telephone is such as not to require either an explosion-proof housing or any auxiliary power supply. Power to the single line instrument 16 within the hazardous environment is provided solely by line power transmitted across two wire transmission path 22. Still further, the single line instrument 16 shown in FIG. 6 does not require the use of an explosion-proof housing in order to comply with the standards set by NEC and Underwriters Laboratory.

The intrinsically safe telephone described and claimed herein was subjected to various tests by the Underwriters Laboratory. Specifically, the telephone was subjected to a spark ignition test using a hydrogen gas and air mixture using the test mechanism described in Section 33 of UL Standard 913, Third Edition. No ignitions resulted. In addition, the components used in the aforementioned telephone were subjected to thermal ignition tests, thermal runaway tests, current limiting resistor tests, atomized water tests, drip tests, temperature tests and dielectric strength tests, mechanical abuse tests and rain tightness tests, and all such tests were passed satisfactorily.

While a particular embodiment of the present invention has been shown and described it will be apparent that other embodiments are possible without departing from the spirit and scope of the present invention and all such modifications and improvements are within the spirit and scope of the appended claims.

What is claimed is:

1. An intrinsically safe telephone for use in a hazardous environment comprising:
   a line powered single line instrument for providing a dialing output and an audio output signal to a telephone network and for receiving a ringing input signal and an audio input signal from that network, said single line instrument being situated in said hazardous environment;
   a two wire transmission path coupling said single line instrument to a safe environment;
   electrical isolation means situated in said safe environment and coupled between said two wire transmission path and said network for controlling power to said single line instrument, said electrical isolation means including
   a telephone line interface for reducing line power from the network to said single line instrument, for reducing the power of incoming ringing signals from the network and for isolating the single line instrument from the network; and
   a shunt diode barrier for controlling the maximum power to the single line instrument.

2. The intrinsically safe telephone of claim 1 wherein said telephone line interface further comprises:
   a ringer circuit for reducing the power of incoming ringing input signals;
   an audio interface circuit for providing electrical isolation between said single line instrument and said telephone network;
   DC/DC converter means for reducing line power to said single line instrument;

off hook means for indicating that the single line instrument is off hook whereby said single line instrument is coupled to line power; and bootstrap power supply means coupled between said single line instrument and said network for driving said off hook means.

3. The intrinsically safe telephone of claim 1 wherein said single line instrument further comprises:

a piezo element responsive to said ringing input signal and generating a ringing output;

an earpiece amplifier coupled to said two-wire transmission path for amplifying said audio input signal from said network;

a dialer means coupled to said two-wire transmission path for generating dialing output signals to said network; and a microphone amplifier coupled to said two-wire transmission path for providing audio output signals to said telephone network.

4. The intrinsically safe telephone of claim 2 wherein said DC/DC converter means further comprises:

pulse width modulator means for generating an AC signal;

transformer means responsive to said pulse width modulator means for transmitting said AC signal across an isolation barrier; and means responsive to said transformer means for converting said AC signal to a direct current signal for transmission across said two-wire transmission path.

5. The intrinsically safe telephone of claim 2 wherein said off hook means further comprises:

an optoelectric circuit coupled between said bootstrap power supply means and said DC/DC converter means for generating a reduced line power signal whenever said single line instrument is off hook.

6. The intrinsically safe telephone of claim 2 wherein said ringer circuit further comprises:

a tone generator coupled between said telephone network and said two-wire transmission path, said tone generator being responsive to said ringing input signals for generating an attenuated ringing signal.

7. The intrinsically safe telephone of claim 3 further comprising:

an audio input transducer for generating an audio input signal to said microphone amplifier; and an audio output transducer for generating an audible output in response to said amplified audio input signal.

8. The intrinsically safe telephone of claim 7 wherein said single line instrument further comprises:

a muting circuit responsive to said dialer means for deactivating said audio input and said audio output transducer upon activation of said dialer means.

* * * * *